United States Patent
Olszak

(10) Patent No.: US 8,701,866 B2
(45) Date of Patent: Apr. 22, 2014

(54) MAT FOR THE TRANSPORT OF AT LEAST ONE OBJECT, A TRANSFER DEVICE AND A METHOD FOR THE TRANSFER

(75) Inventor: Tilo Olszak, München (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/416,187

(22) Filed: Mar. 9, 2012

(65) Prior Publication Data

US 2012/0228090 A1 Sep. 13, 2012

(30) Foreign Application Priority Data

Mar. 11, 2011 (DE) .......................... 10 2011 005 397

(51) Int. Cl.
B65G 47/84 (2006.01)

(52) U.S. Cl.
USPC .................... 198/465.1; 198/847; 198/867.01

(58) Field of Classification Search
USPC ................ 198/846, 847, 465.1, 465.2, 343.2, 198/867.01, 867.14
See application file for complete search history.

(56) References Cited

U.S. PATENT DOCUMENTS

| | | | | | |
|---|---|---|---|---|---|
| 1,438,566 | A | * | 12/1922 | Wiggins | 198/842 |
| 1,656,909 | A | * | 1/1928 | Dewey | 425/452 |
| 3,310,161 | A | * | 3/1967 | Kraft, Jr. | 198/847 |
| 3,952,860 | A | * | 4/1976 | Specht | 198/701 |
| 4,078,654 | A | * | 3/1978 | Sarovich | 198/867.14 |
| 5,220,996 | A | * | 6/1993 | Noestheden | 198/465.1 |
| 5,226,524 | A | * | 7/1993 | Guttinger et al. | 198/343.2 |
| 5,735,384 | A | * | 4/1998 | Lingo et al. | 198/465.1 |
| 5,873,452 | A | * | 2/1999 | Nolan | 198/465.3 |
| 6,415,906 | B2 | * | 7/2002 | Bethke et al. | 198/465.1 |
| 7,060,341 | B2 | * | 6/2006 | Mima et al. | 428/162 |
| 8,261,906 | B2 | * | 9/2012 | Nakano | 198/847 |
| 2003/0057058 | A1 | * | 3/2003 | Iwasa | 198/419.3 |
| 2004/0016373 | A1 | | 1/2004 | Bodde et al. | |
| 2005/0109579 | A1 | * | 5/2005 | Griffin et al. | 198/465.1 |
| 2005/0205226 | A1 | * | 9/2005 | Harder | 162/218 |

FOREIGN PATENT DOCUMENTS

| | | |
|---|---|---|
| DE | 1957043 A1 | 7/1970 |
| DE | 2557025 A1 | 6/1977 |
| DE | 2653159 A1 | 6/1977 |

(Continued)

OTHER PUBLICATIONS

European Search Report for Application No. 12157908.0, dated Jul. 12, 2012.

*Primary Examiner* — Gene Crawford
*Assistant Examiner* — Keith R Campbell
(74) *Attorney, Agent, or Firm* — Marshall, Gerstein & Borun LLP

(57) ABSTRACT

A mat for the transport of an object on a top surface of the mat is disclosed. The mat comprises elastic material, and reinforcements are provided in the mat that are enclosed at least partially by the elastic material. The reinforcements are aligned parallel or approximately parallel to one another, and the elastic material and the reinforcements interact in such a way that a flexing of the mat at a first arc of curvature in a first plane can take place with less force than at a second arc of curvature in a second plane. A transfer device for at least one object in combination with the mat is also disclosed, whereby the transfer device comprises means for moving a mat and means for guiding the mat out of a transport plane. Methods for transferring an object are also disclosed.

13 Claims, 6 Drawing Sheets

(56) References Cited

FOREIGN PATENT DOCUMENTS

| | | |
|---|---|---|
| DE | 3608217 A1 | 9/1987 |
| DE | 199211139 U1 | 10/1992 |
| DE | 20100455 U1 | 3/2001 |
| DE | 69628238 T2 | 2/2004 |
| DE | 102006022574 A1 | 2/2007 |
| DE | 102008009015 A1 | 8/2009 |
| EP | 059947 A1 | 9/1982 |
| EP | 1394058 A1 | 3/2004 |
| GB | 1559697 A | 1/1980 |
| GB | 1571100 A | 7/1980 |
| GB | 2082116 A | 3/1982 |
| WO | WO-02053477 A1 | 7/2002 |

\* cited by examiner

MAT FOR THE TRANSPORT OF AT LEAST ONE OBJECT, A TRANSFER DEVICE AND A METHOD FOR THE TRANSFER

CROSS-REFERENCE TO RELATED APPLICATION

The present application claims the benefit of priority to German Patent Application 102011005397.2, filed Mar. 11, 2011, which is incorporated herein by reference in its entirety.

TECHNICAL FIELD

The present disclosure relates to a mat for the transport of at least one object and to a transfer device, as well as to a method for the transfer.

BACKGROUND

For example, in the food industry, objects of different sizes, shapes and packaging types, as well as different weights, are moved. In the manufacturing, packaging and/or sales areas, conveyor devices, such as conveyor belts, roller conveyors and/or (modular) conveyor mats, can be used for the transport of such objects.

SUMMARY

Some aspects of the present disclosure may guarantee the transport of heavy and/or light, large and/or small objects in a reliable, low-maintenance and flexible manner.

In order to complete the description of the disclosure and in order to give help for a better understanding of the features of the disclosure according to examples of preferred embodiments, drawings are attached that show in a non-restrictive way the following for the purpose of explanation:

DETAILED DESCRIPTION

Figure 1A:
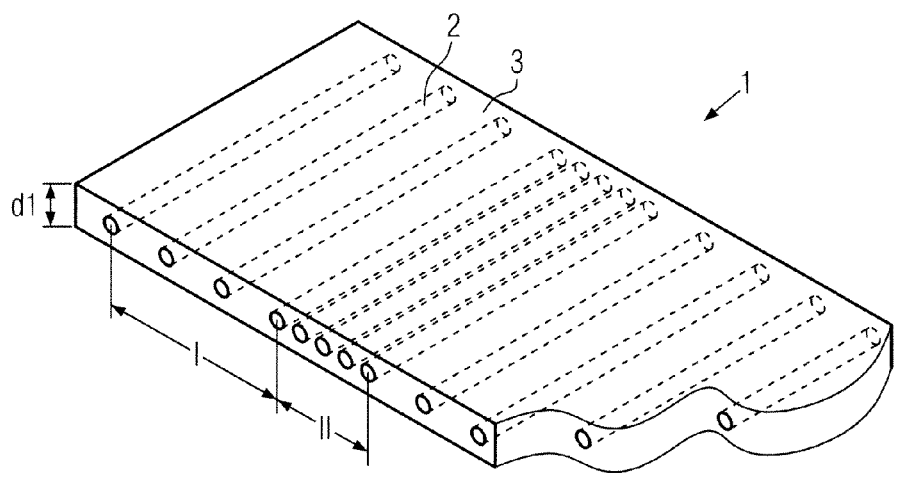
FIG. 1A: a mat in a first embodiment.

Turning now to the drawings, some aspects of the disclosure relate to a mat (also called a tray) for the transport of at least one object, preferably of at least one container in the food industry, on a top surface of the mat, whereby the mat comprises elastic material, whereby reinforcements such as rods, materials with a hardness grade higher than the elastic material, or hollow spaces, woven materials or fibres that lead to reinforcements are provided that are at least partially enclosed by elastic material, whereby the reinforcements are preferably aligned parallel to one another and whereby the elastic material and the reinforcements interact with each other in such a way that a flexing of the mat at a first arc of curvature in a first plane can take place with less force than at a second arc of curvature in a second plane, whereby the first plane and the different plane are not the same plane. In a Cartesian coordinate system, for example, the first plane is spanned by the x- and z-axes and the second plane by the y- and z-axes. The first and the second arcs of curvature thereby have the same shape, but lie in different planes.

The material of the reinforcements preferably possesses a greater flexural strength than that of the elastic material.

The elastic material, for example, a tough elastomer, of the mat possesses elasticity such that shape and volume changes can arise under the influence of external forces, whereby the deformations disappear when the external forces disappear. Because at least one object is to be transported on the top surface of the mat, it is advantageous if the elastic material additionally possesses a certain hardness (for example, measured in accordance with DIN 53505, DIN 7868), for example, Shore D of greater than 45. It is also possible, however, to use an elastic material that possesses a lower hardness (for example, smaller values of Shore D or Shore A).

As a result of this hardness, it can be guaranteed that the at least one object does not push in the top surface of the mat (due to the weight of the object) in such a way that, for example, in the case of an uneven mass distribution in a container, a different impression depth occurs, and consequently a tilted support of the container on the mat can be avoided.

The reinforcements, which are aligned parallel to one another in the mat, can notably be used to give the mat for the transport of at least one object more stability with regard to deformations and thereby nevertheless to allow the elastic properties of the elastic material to be used.

A mat that comprises only an elastic material but no reinforcements can also be used for the transport of objects, but the required force for flexing at a first arc of curvature in a first plane and for flexing at a second arc of curvature of the same shape in a second plane, whereby the first and second planes are not the same plane, is equally large.

Due to the reinforcements comprised within it, the mat according to the disclosure offers different flexural properties, such as, e.g., different flexural strengths, in different directions. If the mat has a cuboid shape with a top side, a bottom side and four side surfaces, the, e.g., right and left edge of the top surface in the transport direction (x-axis) can run perpendicular to the reinforcements and the front and back edges of the top surface can run parallel to the reinforcements.

In order to produce a first arc of curvature, the front and the back (e.g., parallel to the y-axis) edges can be made to approach one another, whereby these edges continue to run parallel to one another. This first arc of curvature then runs in a plane (spanned by the x- and z-axes) that runs perpendicular to the longitudinal axis of the reinforcements (y-axis).

In order to produce a second arc of curvature, the right and the left edges (e.g., parallel to the x-axis) can be made to approach one another, whereby these edges continue to run parallel to one another. This second arc of curvature then runs in a plane (spanned by the y- and z-axes) that runs parallel to the longitudinal axis of the reinforcements. A larger force is needed for producing the second arc of curvature than for producing the first arc of curvature with the same shape, because the reinforcements possess a flexural strength that is greater than that of the elastic material.

Such behaviour of the mat can prove to be advantageous because it can be flexed at different levels of ease in two directions of their top surfaces that are perpendicular to each other. This behaviour is also given if the mat is not cuboid, i.e., does not comprise any right-angled surface, but instead, for example, comprises an elliptic, round or trapezoid-shaped top surface. In order for the mat to remain in a serviceable condition for the transport of at least one object, the result of a flexing of the mat is preferably reversible, i.e., for example, no irreversible deformation of the reinforcements should occur.

The reinforcements can be completely or partially enclosed by the elastic material. They are preferably completely enclosed by the elastic material along their longitudinal direction (y-axis). On the cross-sectional areas, the reinforcements can end, for example, in the edge area of the mat and consequently can be not enclosed by elastic material in this area. It can be provided that a first distance between the top surface of the mat and the reinforcements and a second distance between the bottom surface of the mat and the reinforcements is equally sized or is differently sized. The first distance can hereby be defined by the minimal distance between a point that results when a perpendicular line (z-axis) is dropped through the top surface of the mat that has one or more intersection points with the rod and/or one or more contact points with the rod and the intersection point with the top surface. The second distance can be defined accordingly, if a perpendicular line is dropped through the bottom surface of the mat.

A direction of a longitudinal extension (y-axis) of the reinforcements can extend perpendicular to the first plane (spanned by the x- and z-axes). The reinforcements can run parallel to an edge of the top surface of the mat and preferably they can possess the length of this edge. The reinforcements can, however, also be shorter or longer than the lengths of this edge. It is also possible that the reinforcements possess different lengths or that all possess the same length.

Adjacent reinforcements in the mat can possess the same centre-to-centre distance in each case, or adjacent reinforcements can also possess different centre-to-centre distances. The expression "different" hereby should mean that, for example, three reinforcements possess a first value for the centre-to-centre distance (i.e., the first value of the centre-to-centre distance occurs twice) and that the rest of the reinforcements in each case possess centre-to-centre distances that differ from this first value. It is also possible, however, that all reinforcements possess different or equal values of the centre-to-centre distance in each case.

The centre-to-centre distance between the individual reinforcements can be selected according to the object to be transported. A larger or smaller centre-to-centre distance between the reinforcements can be advantageous, depending on the mass per surface unit of an object.

The ratio of the centre-to-centre distance to a diameter of a rod can lie in the range from 2.5:1 to 5:1; other values can also be provided, however. The ratio of the diameter of the rod to a thickness of the mat can lie in the range from 1:2 to 1:5; other values can also be provided, however.

The reinforcements are preferably aligned parallel to one another (y-axis), but they can also be deflected from the y-axis by 0.1 to roughly 15 angular degrees in the direction of the x- and/or z-axis and/or be only approximately parallel to one another. It is also not necessary for the reinforcements to be linear, and they can instead also be curved or flexed. They can, however, also be linear.

The reinforcements can be made of metal or they can comprise metal. The metal preferably possesses a certain stiffness, so that it does not deform when an object that is to be transported is placed on to the mat. For example, the metal can possess a modulus of elasticity in the range from roughly $1.4 \times 10^5$ N/mm$^2$ to roughly $2.1 \times 10^5$ N/mm$^2$.

The magnitude of the modulus of elasticity is greater the more resistance a material offers to its deformation. A material with a high modulus of elasticity can consequently be said to be stiff while a material with a low modulus of elasticity can be said to be resilient. The modulus of elasticity is defined as the slope of the graph in the stress-deformation diagram in the event of a one-axis load within the linear elasticity range.

The reinforcements can be made of carbon fibre-reinforced material or can comprise carbon fibre-reinforced material, and the reinforcements can preferably furthermore comprise metal. As a result of the use of carbon fibre-reinforced material, the weight of the reinforcements and consequently also of the mat can be kept smaller than when solid metal reinforcements are used. The carbon fibre-reinforced material preferably possesses a modulus of elasticity of at least $1.4 \times 10^5$ N/mm$^2$ (parallel to the fibres).

A reduction in the weight of the reinforcements can also be brought about, however, if instead of solid reinforcements, materials that have a hardness grade that is higher than the hardness grade of the elastic material, hollow reinforcements, woven material reinforcements, fibre reinforcements and/or reinforcements with a honeycomb structure are used. Also possible are reinforcements that comprise or consist of wires, nets or grids and/or that are manufactured from or with materials such as metal, nylon, glass fibres or carbon fibres or that comprise one or more of these materials.

The reinforcements can possess a cylindrical, preferably circular-cylindrical, shape. The base of the cylindrical shape can hereby possess different planar shapes. For example, reinforcements with an elliptic and/or square cross-sectional area are conceivable. In a mat, reinforcements with the same and/or different cross-sectional shapes can occur (same shapes, same/different dimensions). The individual reinforcements in the mat can hereby be formed as solid reinforcements, hollow reinforcements and/or hollow rods with an interior honeycomb structure. The reinforcements in a mat can comprise different types of these embodiments, so that a mat comprises, for example, solid and also hollow reinforcements. However a mat can also comprise reinforcements of a single embodiment.

The elastic material on the top surface and/or on a bottom surface of the mat can possess a coefficient of static friction in the dry state of the top surface and/or of the bottom surface of at least 0.4, particularly of at least 0.5 or 0.6. Due to such a coefficient of static friction, it can be guaranteed that the object does not move relative to the mat during proper transport. A coefficient of static friction of at least 0.5 can advantageously be given in the case of a moist/wet/contaminated top and/or bottom surface of the mat, whereby contamination has come about, for example, due to liquids escaping from a container.

A transfer device in combination with a mat according to the disclosure or with another mat comprises a means for moving the mat and guidance means for guiding the mat out of a transport plane. Here preferably a mat such as the mat with reinforcements described above or further below can be used, but a mat without reinforcements can also be used. The material of such mats is elastic. The mats can, e.g., be manufactured from a tough elastomer or they can comprise such a material. Without reinforcements, the material of the mats possesses flexural behaviour that is the same in the first and second planes (x-z plane and y-z plane) described above.

The guidance means can comprise guidance rollers. The guidance rollers can exert an external force on the mat, for example, in the edge areas of the mat, and by means of an appropriate arrangement ensure that the mat is moved out of a transport plane. The guidance rollers are advantageously arranged and formed in such a way that an object located on a top surface of the mat can be transported without obstruction during transport by means of the mat.

Because the object to be transported is located on the top surface of the mat (i.e., above the transport plane) and is to be brought from this mat, for example, on to a conveyor band or a pallet, the mat is advantageously moved in an area below the transport plane. The reinforcements in the mat are advantageously arranged perpendicular to the transport direction for such a movement. The mat is curved out of the transport plane during the movement of the mat.

The transfer device can further comprise a slide that is formed in such a way that it can slide the at least one object from the mat. The slide can preferably comprise a movable arm that makes it possible to position the slide in such a way that the slide can be brought into contact with the at least one object when the object is located on the mat and can remain in contact with it while the object, together with the mat, moves. The contact between the slide and the object can also be maintained until the object has been slid from the mat and, for example, has been brought on to a conveyor belt or on to a pallet following the transfer device. If the slide is no longer needed, it can be moved, for example, into an idle position, by means of the movable arm. The slide can possess such a shape and size that an object can be supported, for example, on a side surface.

A transfer device can further be provided with which an object is transferred to a mat. The mat is thereby loaded with the object. Means are thereby provided with which a mat can be brought from an area in which the mat is curved into a transport plane. In the transport plane, the mat itself is flat, meaning not curved.

The area in which the mat is curved is advantageously located below the transport plane. As a result, the object can be guided on to the upper side of the mat without colliding with the track of the mat.

The object is preferably placed on to the area of the mat that is located in the transport plane. This allows a reliable placement of the object on to a flat surface of the mat, so that the object is prevented from tilting and possibly falling.

In order to move the object into the position on the mat, a slide, for example, can be provided. In this way, the object can be moved at a well-defined speed, whereby this speed preferably corresponds to the speed of the mat during the transfer of the object. Instead of or in addition to a slide, a down-grade can also be provided, such as a tilted conveyor surface, chute, tilted roller conveyor or the like, on which the object can move in the direction toward the mat under the influence of gravity.

A method for transferring at least one object, preferably at least one container in the food industry, that is located on a top surface of a mat according to the disclosure or of another mat comprises the following steps:

Movement of the mat in a transport plane and in a transport direction, whereby the transport direction is preferably defined by the fact that it runs perpendicular to the longitudinal extension of the reinforcements, and Movement of the mat through an area that is equipped with guidance means and thereby the exertion of a force across at least a portion of the top surface of the mat on to the mat by means of the guidance means, as a result of which a first portion of the mat that has been moved through the area that is equipped with the guidance means is flexed downwards out of the transport plane and whereby a second portion of the mat, which has not yet been moved through the area that is equipped with guidance means, remains in the transport plane.

The method can furthermore comprise supporting the at least one object by means of a slide when the at least one object reaches the area that is equipped with the guidance means. The at least one object can moreover be slid, preferably in the transport plane, by means of the slide.

The method can comprise the transfer of the at least one object to a conveyor belt, a pallet, a roller conveyor or the like.

In the case of a transfer method, an object can further be transferred to a position on a mat that comprises the elastic material and possibly reinforcements. The mat is thereby moved out of an area in which the mat is curved and into the transport plane. The object can preferably be transferred on to the area in which the mat is located in the transport plane. The object can come from a conveyor belt, a pallet, a roller conveyor, a chute or a down-grade. It can also thereby be moved by a slide. As a result of the slide or a down-grade or a conveyor, it is possible to move the object at the same speed (within 10%) as the mat. As a result, a transfer of the object without jerks results, without a risk that the object could tip over.

In one example, FIG. 1A shows a view of an embodiment of a mat 1 for the transport of at least one object. The depicted mat 1 possesses a cuboid shape with a thickness d1 and comprises reinforcements 2 that are at least partially enclosed by an elastic material 3. The reinforcements 2 are enclosed by the elastic material 3 along their longitudinal direction. On the front sides, the reinforcements 2 end in the area of side surfaces of the mat 1 and are there not enclosed by the elastic material 3. It can also be provided, however, that the reinforcements 2 end within the mat 1 and consequently within the elastic material 3, so that the reinforcements 2 are also enclosed by the elastic material 3 on their front sides. This can be advantageous if the mat 1 is subject to lateral guidance, for example, during the forward movement on a roller conveyor, because then the same and not changing material comes into contact with the lateral guide.

The reinforcements 2 are aligned parallel to one another and possess a centre-to-centre distance apart from one another that can be selected in a ratio to the diameter of the reinforcements 2 and/or the thickness d1 of the mat 1 and/or to the at least one object that is to be transported. In the shown embodiment, the mat 1 comprises two areas I, II in which adjacent reinforcements 1 possess different centre-to-centre distances. The centre-to-centre distance is greater in the first area I than in the second area II.

The centre-to-centre distance between the individual reinforcements 2 can be selected according to the objects to be transported. A larger or smaller centre-to-centre distance between the reinforcements 2 can be required, depending on the mass per surface unit that an object exerts. The stability of the reinforcements 2 can also be correspondingly influenced by their thickness or their structure.

Figure 1B:
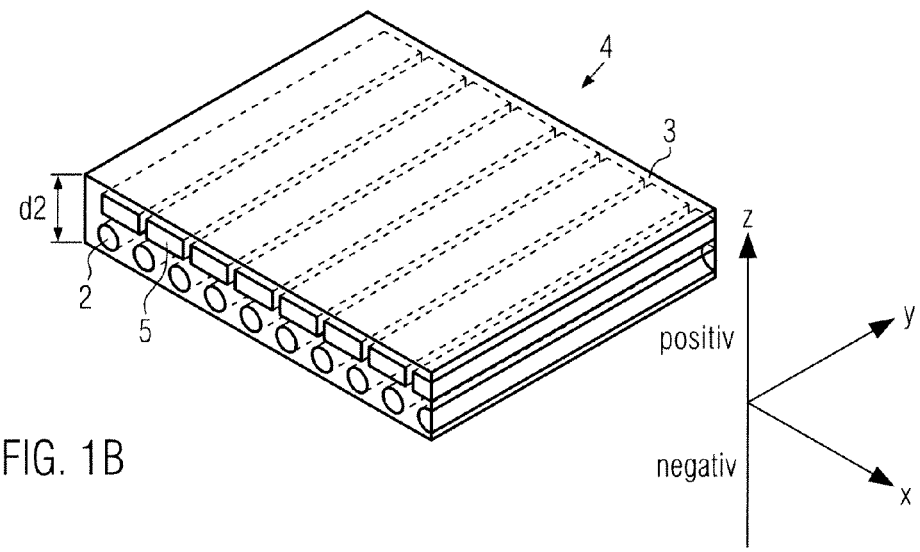
FIG. 1B: a mat in a second embodiment.

FIG. 1B shows a second embodiment of a mat 4 with a thickness d2 for the transport of at least one object. In addition to the reinforcements 2, the mat 4 hereby also comprises elements 5 that are located in a plane between the reinforcements 2 and the top surface of the mat 4. These elements 5 are also at least partially enclosed by the elastic material 3. These elements 5 are likewise aligned parallel to one another, whereby the centre-to-centre distance between the elements 5 or the size of the elements 5 is selected in such a way that the distance between the elements 5 can be less than the distance between the reinforcements 2. In the depiction, the elements 5 possess a cuboid structure; other suitable structures are also possible, however. The elements 5 can comprise the same material as the reinforcements 2 or instead also other materials.

As a result of the additional elements 5, the reinforcements 2, the elastic material 3 and the additional elements 5 interact in such a way that the mat 4 can be flexed at a different force in a plane that runs perpendicular to the longitudinal direction (y-axis) of the reinforcements 2 and, e.g., parallel to the mat top surface. If the x-y plane of a Cartesian coordinate system is set for example by the longitudinal direction (y-axis) of the reinforcements 2 and the z-axis is aligned perpendicular to the mat top surface in the area of the mat that comprises the elements 5, an arc of curvature can be produced in the negative z-direction (curvature with the concave side down) with less force than an arc of curvature in the positive z-direction (curvature with the concave side up) because the elements 5 hinder a compression of the mat (i.e., of the elastic material in this area) above the reinforcements 2. According to an embodiment, the mat can possess different flexural stiffness levels during a curvature of the mat in opposite directions.

Figure 2A:
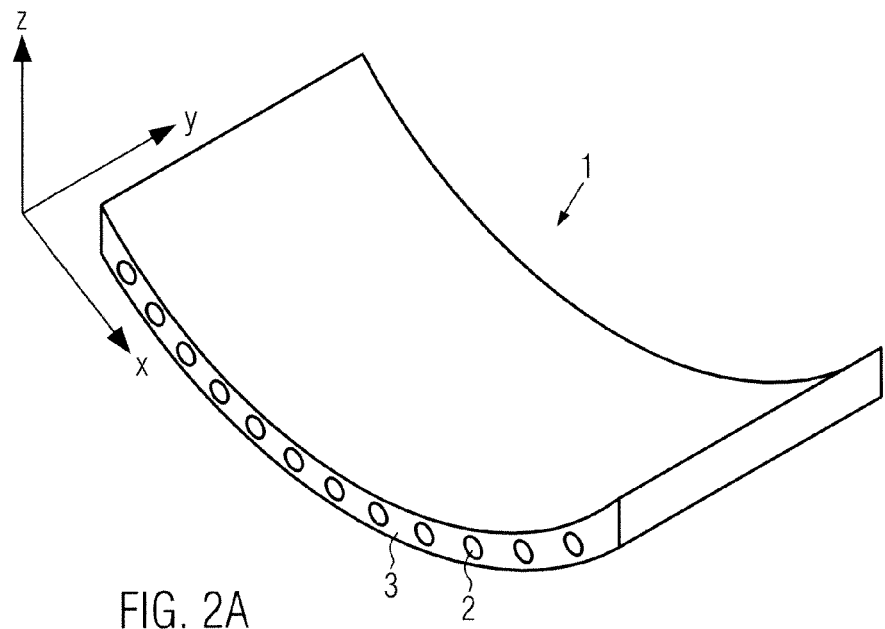
FIG. 2A: flexing of the first embodiment at a first arc of curvature.
Figure 2B:
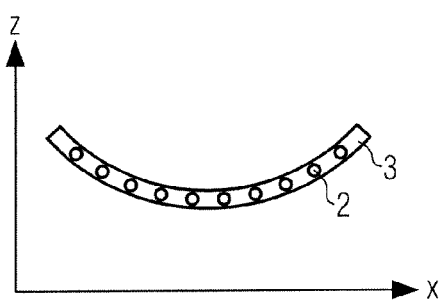
FIG. 2B: the deformation of the first embodiment in the x-z direction.
Figure 2C:
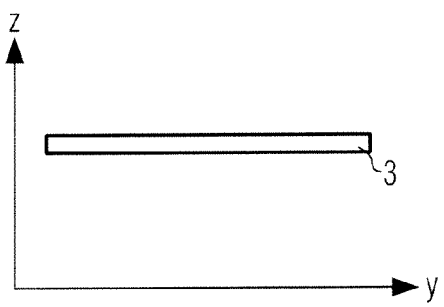
FIG. 2C: the deformation of the first embodiment in the y-z-direction.

FIG. 2A depicts a mat 1 of the first embodiment that is flexed with a first arc of curvature in an x-z plane that runs perpendicular to the longitudinal extension of the reinforcements 2 (y-axis). FIGS. 2B and 2C show the view of the mat in a sectional view in the x-z plane and in a sectional view in the y-z plane, respectively.

In the x-z plane, a flexing of the mat 1 can result from the elastic material 3 that at least partially encloses the reinforcements 2. No flexing of the mat 1 occurs in the y-z plane.

Figure 3A:
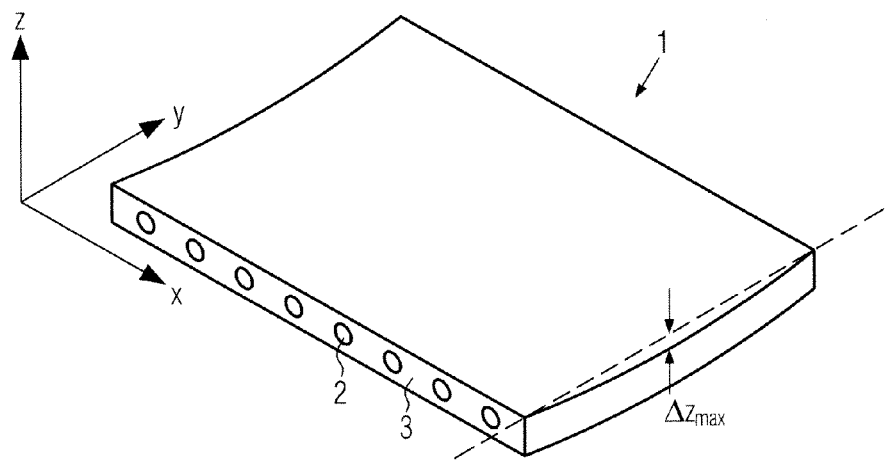
FIG. 3A: flexing of the first embodiment at a second arc of curvature in the second plane, which is spanned by the z and y axes.
Figure 3B:
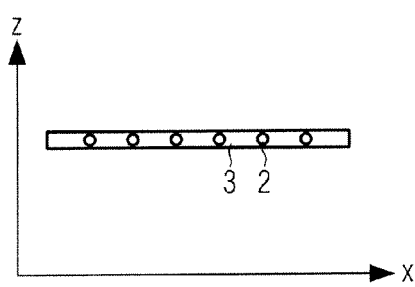
FIG. 3B: the deformation of the first embodiment in the x-z direction.
Figure 3C:
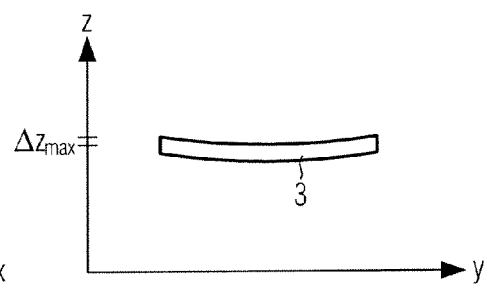
FIG. 3C: the deformation of the first embodiment in the y-z direction.

FIG. 3A depicts a mat 1 of the first embodiment that is flexed with a second arc of curvature in y-z a plane that runs parallel to the longitudinal extension of the reinforcements 2 (y-axis). FIGS. 3B and 3C show the view of the mat in a sectional view in the x-z plane and in a sectional view in the y-z plane, respectively.

In the y-z plane, the flexing possibility of the mat 1 is restricted due to the reinforcements 2 that it comprises, so that only a restricted flexing is possible in a direction parallel to the longitudinal direction (y-axis) of the reinforcements 2. During flexing of the mat 1 that would lead to a deformation in the z-direction by more than $\Delta z_{max}$, there would result a plastic deformation of the reinforcements 2 and consequently the mat 1 would not be in a condition possible for use or it would only be in a restricted condition possible for use.

No flexing of the mat 1 occurs in the x-z plane (FIG. 3B).

The properties of the mat 1 that are depicted in FIGS. 2A to 3C reflect the desired behaviour of such a mat 1. In the event of the action of an external force, the mat is easier to deform in the x-z plane than in the y-z plane. This can be advantageous for the transport of objects.

Figure 4:
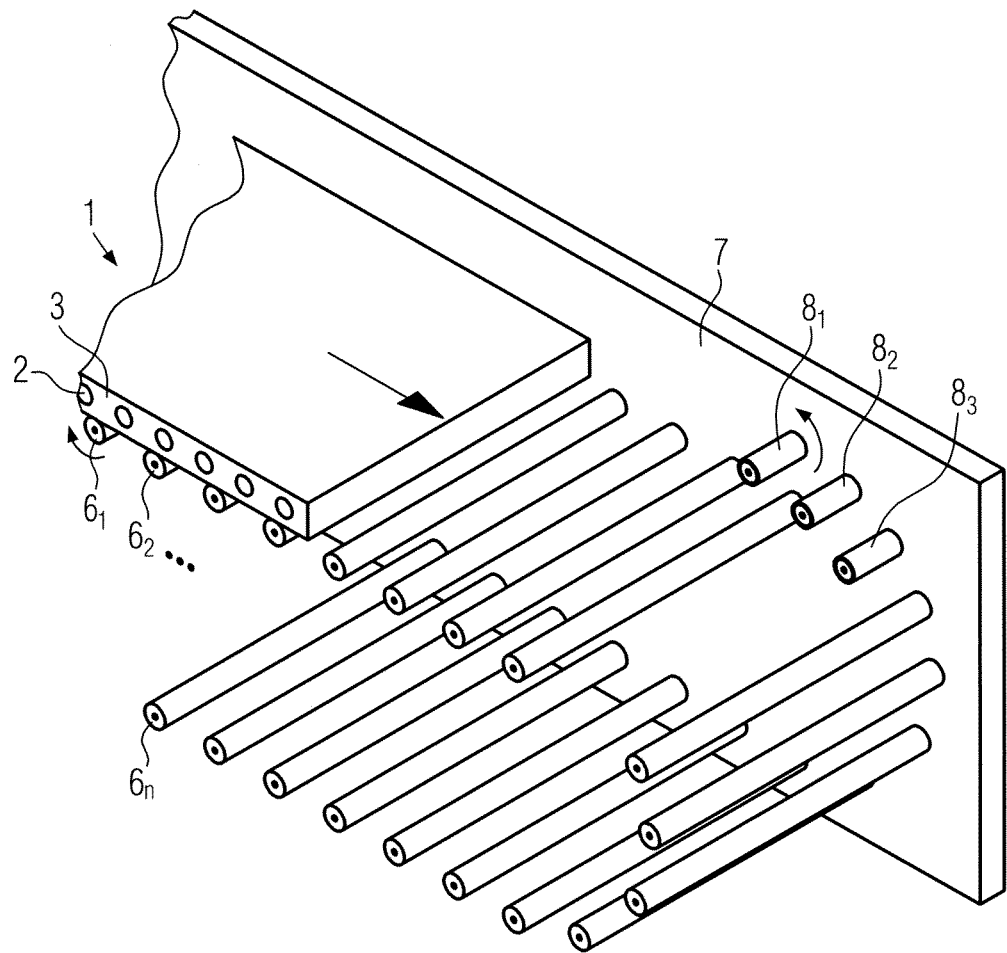
FIG. 4: a view of a transfer station.

FIG. 4 shows a view of a transfer device. A mat 1 of the first embodiment is moved forwards on a roller conveyor by means of rollers $6_1 \ldots 6_n$. The rollers $6_1 \ldots 6_n$ can, for example, be mounted on a lateral limitation 7, whereby this limitation 7 can furthermore provide lateral guidance of the mat 1. In order to allow a return of the mat 1, the transfer station possesses guidance rollers $8_1 \ldots 8_3$ that initiate a deflection of the mat 1 out of the plane of the roller conveyor. By means of the guidance rollers $8_1 \ldots 8_3$, an external force can be exerted on the mat 1, so that the mat 1 can be flexed with an arc of curvature that runs in a plane perpendicular to the longitudinal direction (y-axis) of the reinforcements 2. Instead of guidance rollers 8, other guidance means, such as motion links or belts, can also be provided. After the mat 1 has been flexed out of the plane of the roller conveyor, the mat 1 can be transported forward by using additional rollers and consequently, for example, to a location at which the mat 1 can be used again for the transport of at least one object.

The guidance rollers $8_1 \ldots 8_3$ can possess a diameter that is greater than or equal to or less than that of the rollers 6. The length (measured in the axial direction) of the guidance rollers $8_1 \ldots 8_3$ is shorter than that of the rollers 6, because these extend across the conveyor width, while the guidance rollers $8_1 \ldots 8_3$ are provided only on the sides. FIG. 4 depicts only the guidance rollers $8_1 \ldots 8_3$ on a back side of the conveyor in FIG. 4. Corresponding guidance rollers are also provided on the front side, but these are not depicted here for the sake of clarity.

The following shows how a transfer of a container from a mat 1 to a conveyor belt 10 can take place on the basis of FIGS. 5A to 5D.

FIGS. 5A to 5D show how a container 9 can be transported along a roller conveyor with rollers $6_1 \ldots 6_n$ and a lateral limitation 7 by means of a mat 1. In the figures, only the lateral limitation 7 is shown that is located in the picture plane behind the mat 1 and the container 9; the lateral limitation that is located in the picture plane in front of the mat 1 and the container 9 was left out for the sake of clarity. Due to the rotation of the rollers $6_1 \ldots 6_n$, the mat 1 is moved forward in the direction of a transport direction and the mat 1 is moved together with the container 9 relative to the roller conveyor (in the depiction, the transport of the container 9 takes place from left to right).

While here a mat such as it was described above can be used, it is also possible to use simpler mats that, although they comprise elastic material, do not comprise any reinforcements. The flexural behaviour of the material of such mats is the same in two different planes, for example.

Figure 5A:
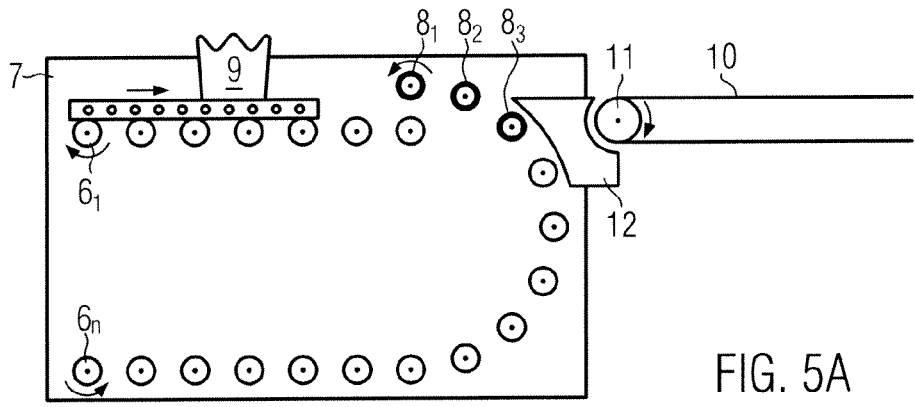
FIGS. 5A to 5D: a container on the way from a mat through a transfer station.

FIG. 5A shows how the mat is moved on to the transfer station by means of the roller conveyor by rotating the rollers $6_1 \ldots 6_n$. A container 9 located on the top surface of the mat 1 is correspondingly moved forwards together with the mat. When the mat 1 reaches an end of the roller conveyor, the mat 1 can be moved out of a transport plane by using the guidance rollers $8_1 \ldots 8_3$ that exert an external force on the mat 1.

In the depicted case, the transport plane runs parallel to the longitudinal extension of the rollers $6_1 \ldots 6_n$, or also parallel to the longitudinal extension of the reinforcements 2 (i.e., perpendicular to the drawing plane) and through the centre plane of the mat 1.

Figure 5B:
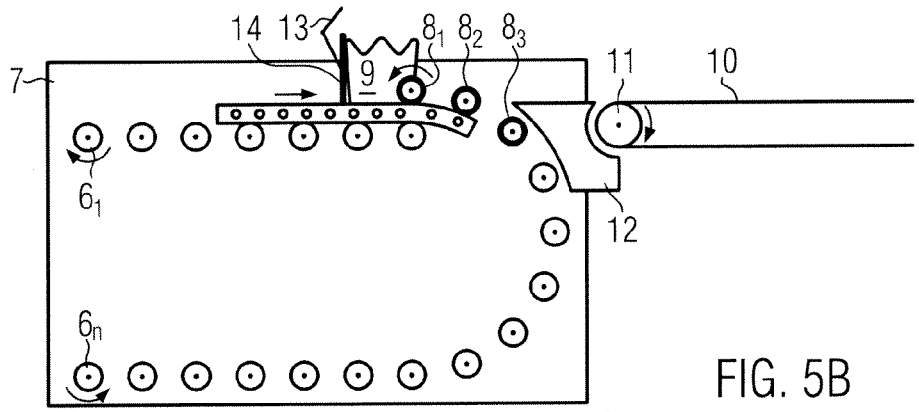
Figure 5C:
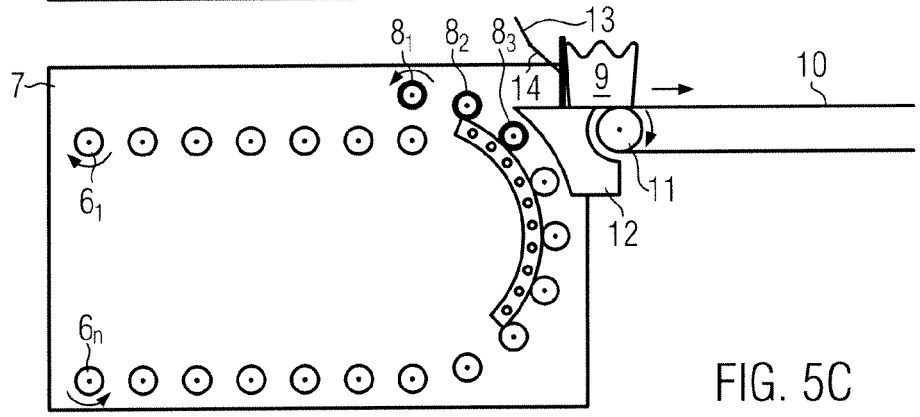
Figure 5D:
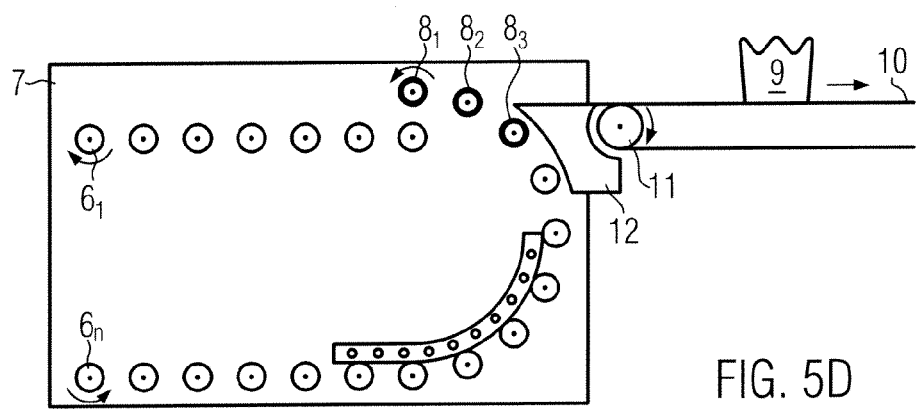

As a result of the force transmission of the guidance rollers $8_1 \ldots 8_3$, the mat 1 can, as depicted in FIG. 5B, be curved away downwards, so that a transfer of the container 9 to a conveyor belt 10 that can be moved forwards by means of a roller 11 can take place. The guidance rollers $8_1 \ldots 8_3$ are hereby (as depicted in FIG. 4) formed in such a way that they possess a limited length and do not extend across the entire width of the roller conveyor. The transport of the container 9 is consequently not hindered by the guidance rollers $8_1 \ldots 8_3$ and the container 9 can therefore be moved to the lateral limitation 7 unhindered between the guidance rollers $8_1 \ldots 8_3$, each of which is mounted on opposite sides of the roller conveyor.

Because the mat 1 comprises reinforcements 2 that are aligned perpendicular to the transport direction, it is possible, as mentioned above, to transfer a force to the mat 1 by means of these guidance rollers $8_1 \ldots 8_3$ in an edge area of the top surface of the mat 1. A bulging of the mat 1 in an area between the guidance rollers $8_1 \ldots 8_3$ is prevented by the reinforcements 2. If there were no reinforcements, a mat, if it consisted of elastic materials, could bulge because no force is transferred from above onto the top surface of the mat in the area between the guidance rollers $8_1 \ldots 8_3$.

As shown in FIGS. 5A to 5D, the guidance rollers $8_1 \ldots 8_3$ are hereby arranged at successive positions in the direction of the transport direction, whereby a first guidance roller $8_1$ acts on the top surface of the mat 1 and consequently transfers a force while the entire mat 1 is still located in the transport plane. A second guidance roller $8_2$ is arranged to the right of the first guidance roller $8_1$ and is located below the first guidance roller $8_1$, so that this second guidance roller $8_2$ exerts a force from above on to the top surface of the mat 1, as a result of which the mat 1 is curved downwards away from the transport plane. A third guidance roller $8_3$ is arranged to the right of the second guidance roller $8_2$ and is located below the second guidance roller $8_2$. Consequently, on the top surface of the mat 1 that has already been curved downwards a further force can be exerted which further curves the mat 1 downwards.

The mat 1 that has been curved downwards can be transported back, for example, to a starting point at which mats 1 that are not in use can be stored, by means of rollers $6_1 \ldots 6_n$ in a plane below the transport plane. The rollers 6 that connect to the guidance rollers 8 can again extend across the entire width of the conveyor.

In order to transfer the container on to the conveyer belt 10 after the descent of the mat 1, a slide 14 with a movable arm 13 is provided that slides the container 9 from the mat 1 on to the conveyor belt 10. It can also be provided that the slide 14 supports the container 9 in that the slide 14 follows the container 9 by means of the movable arm 13 during the forward movement of the container 9 on the mat 1. In order to bridge a distance that may exist between the area of the descending mat 1 and the conveyor belt 10, a support structure 12 can be provided that, for example, prevents a container from becoming wedged in this area. In order for the container 9 to be able to pass this support structure 12 without problems, the slide 14 can now slide the container 9 in the direction of and on to the conveyor belt 10, in addition to having its support function.

The mat 1 and the conveyor belt 10 advantageously have the same speed so that during a transfer of the container there is no acceleration or deceleration of the container 9 which could lead to an instable position of the container 9. The mat 1 and the conveyor belt 10 can also, however, possess different speeds because the slide 14 can give the container stability during the transfer if the slide 14 possesses, for example, such a shape and size that the container 9 can, for example, be supported on a lateral surface.

After the conclusion of the transfer of the container 9 to the conveyor belt 10 (FIG. 5D), i.e., the container 9 is then located with its base completely on the conveyor belt 10, the transfer of the container 9 by means of the slide 14 ends.

It is also possible that the container 9 is transferred to a pallet or another device (instead of on to a conveyor belt 10), whereby the pallet (or another device) can be at rest. The container 9 can likewise be transferred to another roller conveyor or also to another mat 1, 4.

FIG. 6 shows a transfer device for transferring an object on to a mat. The mat can be an above-described mat (with reinforcements) or also a simpler mat, meaning one without reinforcements.

The transfer device comprises rollers $20_1$ to $20_n$ with which a mat can be guided or moved. At least some of the rollers can be driven, so that consequently the mat can be moved. The mat can be guided between groups of rollers $20_1$ to $20_n$ and $21_1$ to $21_m$ that are located on opposite sides of the track of a mat and can act on opposite sides of a mat. In this way, a mat can be guided or conveyed in a stable manner, even if the mat is guided in a vertical position or is turned (top side down and bottom side up). Rollers on opposite sides of the track of the mat can also form roller pairs, of which at least one, preferably both, are driven in order to convey the mat. The mat can be clamped between two rollers of a roller pair and be guided or conveyed under the pressure that is produced in this way.

The transfer device comprises an area 27 in which the mat is curved.

Rollers $22_1$ to $22_1$ are furthermore provided that define a transport plane in which the mat can be transported in a flat (not curved) position.

A support structure 25 can be provided between a feeding conveyor 23 and the rollers 20, 21, 22, whereby this support structure 25 bridges the area between the feeding conveyor and the rollers.

Figure 6A:
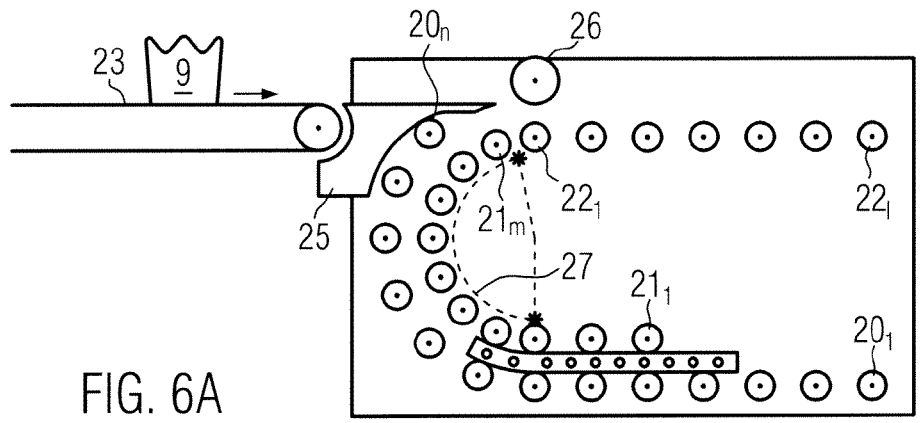
FIGS. 6A to 6C: a container on the way through a transfer station, on a mat.

According to FIG. 6A, a mat is fed below the transport plane. The front area of the mat is already curved upwards and moved upwards in the area 27. An object 9 arrives on the feeding conveyor 23, whereby this object 9 is to be transferred to a position on the mat.

Figure 6B:
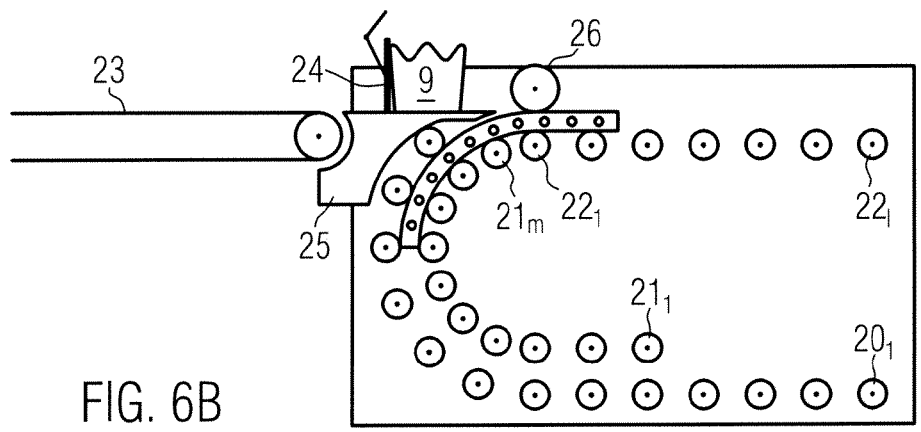

FIG. 6B shows how the mat has already been further conveyed upwards and turned in this process. The front end of the mat is already located in the transport plane and is flat. The object 9 is put on to what is then the top side of the mat, for example, by means of a slide 24. The rear portion of the mat is still curved in the area 27. It arrives in the transport plane below the object 9.

Figure 6C:
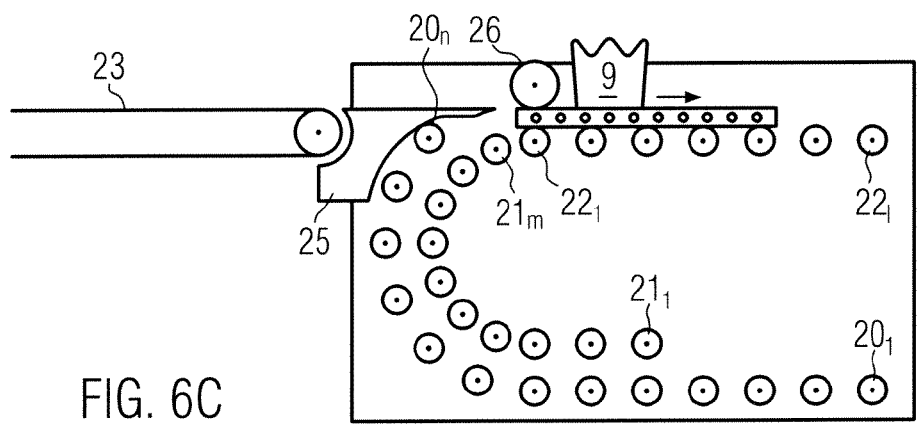

FIG. 6C depicts how the mat as a whole has been brought into the transport plane and now is transported in a flat position. The transferred object 9 is located on the mat.

FIG. 6B shows a roller 26 that, for example, can be provided on the edge of the conveyor belt. Two such rollers 26 can be provided on the left and right sides of the track of the mats, viewed in the conveying direction of the mats, and can help to move the mat out of the area 27, in which the mat is curved, into the transport plane in a flat position. The rollers 26 thereby press the mat downwards, so that it comes into the transport plane flat instead of in a bunched up position. The rollers 26 thereby act on the top side of the mats. A plurality of roller pairs 26 (in each case, a roller of the pair 26 to the right and left) can be provided along the track of the mats in order to achieve better guidance of the mats. The objects 9 can run through between two rollers 26, one of which is provided on the right and one of which is provided on the left side of the track of the mats.

Instead of or in addition to a slide 24, the support structure 25 can also be formed in a tilted manner. It can also possess rollers itself, on which the object 9 slides downwards due to gravity.

Numerous modifications to the mats, transfer devices, and methods disclosed herein will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

The invention claimed is:

1. A transfer device for transferring an object comprising at least one container in the food industry, in combination with a mat for the transport of at least one object on a top surface of the mat, wherein the mat comprises elastic material, wherein reinforcements are provided in the mat that are at least partially enclosed by the elastic material, wherein the reinforcements are aligned parallel or approximately parallel to one another, wherein the elastic material and the reinforcements interact in such a way that a flexing of the mat at a first arc of curvature in a first plane can take place with less force than at a second arc of curvature of the same shape in a second plane, and wherein the first plane and the second plane are not the same plane, wherein the transfer device comprises:

means for moving the mat in a transport direction, wherein the means for moving is a roller conveyor with rollers, and the object can be transferred out of a position on the mat to another position, guidance means for guidance of the mat out of a transport plane , wherein the guidance means are guidance rollers possessing a limited length and not extending across the entire width of the roller conveyor, the guidance rollers being adapted to initiate a deflection of the mat out of the plane of the roller conveyor by exerting an external force to the mat in an edge area of the top surface of the mat, so that the mat is flexed with the first arc of curvature that runs in a plane perpendicular to a longitudinal direction of the reinforcements.

2. The transfer device according to claim 1 wherein the guidance rollers are arranged and formed in such a way that an object located on a top surface of the mat can be transported unhindered during a transport by means of the mat.

3. The transfer device according to claim 1 wherein the transfer device further comprises a slide that is formed in such a way that the slide can slide the at least one object from the mat wherein the slide comprises a movable arm.

4. A transfer device for transferring an object, in combination with a mat for the transport of at least one object on a top surface of the mat, wherein the mat comprises elastic material, wherein reinforcements are provided in the mat that are at least partially enclosed by the elastic material, wherein the reinforcements are aligned parallel or approximately parallel to one another, wherein the elastic material and the reinforcements interact in such a way that a flexing of the mat at a first arc of curvature in a first plane can take place with less force than at a second arc of curvature of the same shape in a second plane, and wherein the first plane and the second plane are not the same plane, wherein the transfer device comprises:

means for moving the mat in a transport direction, wherein the means for moving is a roller conveyor with rollers, and wherein the object can be transferred on to a position on the mat, guidance means for guiding a mat out of an area in which the mat is curved and into a transport plane, wherein the guidance means are two groups of rollers being located on opposite sides of a track of the map and being adapted to act on the opposite sides of the map, such that the map is guided between the two groups of rollers and wherein the guidance means further comprise at least one roller pair being provided on the left side and right side of the track of the mat being adapted to press the mat downwards, so that it comes into the transport plane.

5. Transfer device according to claim 4 wherein the guidance means can guide the mat out of an area below the transport plane and into the transport plane.

6. Transfer device according to claim 4 wherein the object can be transferred on to a portion of the mat that is located in the transport plane.

7. Transfer device according to claim 4, wherein a slide or down-grade is provided with which the object can be transferred on to the mat.

8. A method for transferring at least one object comprising at least one container in the food industry, wherein the at least one object is located on a top surface of a mat for the transport of at least one object on a top surface of the mat, wherein the mat comprises elastic material, wherein reinforcements are provided in the mat that are at least partially enclosed by the elastic material, wherein the reinforcements are aligned parallel or approximately parallel to one another, wherein the elastic material and the reinforcements interact in such a way that a flexing of the mat at a first arc of curvature in a first plane can take place with less force than at a second arc of curvature of the same shape in a second plane, and wherein the first plane and the second plane are not the same plane, wherein the method comprises the following steps:

moving the mat in a transport plane and in a transport direction using a roller conveyor with rollers, and moving the mat through an area that is equipped with guidance means, wherein the guidance means are guidance rollers possessing a limited length and not extending across the entire width of the roller conveyor, the guidance rollers initiating a deflection of the mat out of the transport plane by exerting an external force to the mat in an edge area of the top surface of the mat , thereby flexing the mat with the first arc of curvature that runs in a plane perpendicular to a longitudinal direction of the reinforcements and as a result of which a first portion of the mat that has been moved through the area that is equipped with the guidance means is flexed downwards out of the transport plane, and wherein a second portion of the mat that has not yet been moved through the area that is equipped with the guidance means remains in the transport plane.

9. The method according to claim 8, further comprising the step:

supporting the at least one object by means of a slide when the at least one object reaches the area that is equipped with the guidance means.

10. The method according to claim 9, further comprising the step:

sliding the at least one object in the transport plane, by means of the slide.

11. The method according to claim 8, further comprising the step:

transferring the at least one object to a conveyor belt, a pallet, or a roller conveyor.

12. A method of transferring at least one object comprising a container in the food industry, wherein the at least one object is transferred on to a top surface of a mat for the transport of at least one object on a top surface of the mat, wherein the mat comprises elastic material, wherein reinforcements are provided in the mat that are at least partially enclosed by the elastic material, wherein the reinforcements are aligned parallel or approximately parallel to one another, wherein the elastic material and the reinforcements interact in such a way that a flexing of the mat at a first arc of curvature in a first plane can take place with less force than at a second arc of curvature of the same shape in a second plane, and wherein the first plane and the second plane are not the same plane, wherein the method comprises the following steps:

moving the mat out of an area in which the mat is curved and into a transport plane, wherein guidance means for exerting a force on the mat in order to transfer the mat into a flat state from a curved state are provided, wherein the guidance means are two groups of rollers being located on opposite sides of a track of the map and being adapted to act on the opposite sides of the map, such that the map is guided between the two groups of rollers and wherein the guidance means further comprise at least one roller pair being provided on the left side and right side of the track of the mat being adapted to press the mat downwards, so that it comes into the transport plane.

13. A method according to claim 12 wherein the object is slid or is located on a tilted conveyor plane so that the object is moved by gravity in order then to arrive at the position on the mat.

* * * * *